(12) United States Patent
Humfeld et al.

(10) Patent No.: US 10,682,822 B2
(45) Date of Patent: Jun. 16, 2020

(54) MATERIALS AND METHODS FOR NUCLEATING ALIGNED THERMOPLASTIC CRYSTALS WHILE FABRICATING THERMOPLASTIC CARBON FIBER REINFORCED POLYMER STRUCTURES

(71) Applicant: The Boeing Company, Chicago, IL (US)

(72) Inventors: Keith D Humfeld, Federal Way, WA (US); Scott Hartshorn, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 195 days.

(21) Appl. No.: 15/933,559

(22) Filed: Mar. 23, 2018

(65) Prior Publication Data

US 2019/0292336 A1 Sep. 26, 2019

(51) Int. Cl.

| | |
|---|---|
| *B29C 71/00* | (2006.01) |
| *C08J 5/12* | (2006.01) |
| *C08G 65/40* | (2006.01) |
| *C08K 3/08* | (2006.01) |
| *B32B 5/16* | (2006.01) |
| *B29C 70/62* | (2006.01) |
| *C08J 5/10* | (2006.01) |

(52) U.S. Cl.
CPC .......... *B29C 71/0063* (2013.01); *B29C 70/62* (2013.01); *B29C 71/0072* (2013.01); *B32B 5/16* (2013.01); *C08G 65/4012* (2013.01); *C08J 5/10* (2013.01); *C08J 5/121* (2013.01); *C08K 3/08* (2013.01); *C08G 2650/40* (2013.01); *C08J 2300/22* (2013.01); *C08K 2003/0843* (2013.01); *C08K 2003/0856* (2013.01); *C08K 2003/0862* (2013.01); *C08K 2201/01* (2013.01); *Y10T 428/24802* (2015.01); *Y10T 428/24893* (2015.01)

(58) Field of Classification Search
CPC ............. B29C 71/0063; B29C 71/0072; Y10T 428/24802; Y10T 428/24893
See application file for complete search history.

(56) References Cited

U.S. PATENT DOCUMENTS 4,000,229 A * 12/1976 Wainer ................ B29C 45/0005
264/437

OTHER PUBLICATIONS

Erb, R.M., et al., "Composites Reinforced in Three Dimensions by Using Low Magnetic Fields," Science, vol. 335, Jan. 13, 2012, pp. 199-204. available at: www.sciencemag.org/cgi/content/full/335/6065/199/DC1.

Ebert, F., et al., "Controlling the Orientation of Semicrystalline Polymers by Crystallization in Magnetic Fields," Macromolecules 2003, vol. 36, No. 23, Jun. 5, 2003, pp. 8685-8694.

Ezure, H., et al., "Magnetic Orientation of Isotactic Polystyrene," Macromolecules 1997, vol. 30, No. 12, Jan. 22, 1997, pp. 3600-3605.

* cited by examiner

*Primary Examiner* — Gerard Higgins
(74) *Attorney, Agent, or Firm* — Coats & Bennett, PLLC

(57) ABSTRACT

The present disclosure relates to methods and systems for making thermoplastic resin materials and composite resin systems and materials made from the thermoplastic resins, by seeding one melted thermoplastic material with a second thermoplastic material in a crystalline state that comprises an amount of ferromagnetic material.

20 Claims, 8 Drawing Sheets

MATERIALS AND METHODS FOR NUCLEATING ALIGNED THERMOPLASTIC CRYSTALS WHILE FABRICATING THERMOPLASTIC CARBON FIBER REINFORCED POLYMER STRUCTURES

TECHNOLOGICAL FIELD

The present disclosure relates generally to the field of thermoplastic resin materials and systems. More specifically the present disclosure relates to methods preparing an oriented thermoplastic resin material and system, and the oriented thermoplastic resin materials and systems made according to methods presented herein.

BACKGROUND

The use of composite materials as replacements for metals in the manufacture of various components continues to increase, at least in part, due to composite materials' high strength-to weight ratio as compared to metals. Polymer matrices in composite materials include various reinforcing materials including: glass, steel, aramid, boron, carbon, etc., often in the form of fibers. The fibers afford the polymers increased strength and stiffness along the axis of reinforcement.

Thermoplastic polymer resin systems provide desirable characteristics in the manufacture of various composite materials. However, studies have determined that as melted thermoplastic materials cool, grain boundaries forming in the solidifying crystalline thermoplastic structure can impact mechanical properties in resulting composite materials comprising such thermoplastic resin systems. During thermoplastic resin cooling, grain boundaries form as a result of random crystal orientation that occurs upon cooling. Complex processing protocols relative to temperature control have been attempted to minimize grain boundaries. However, such complex temperature control protocols further complicate tooling and cooling system design, and further limit the variety and type of parts that can be produced using, for example, crystalline thermoplastic carbon fiber reinforced polymers (CFRPs).

For example, one protocol used to minimize grain boundary formation involves cooling a melted polymer from above its melting temperature to 30° F. below its melting temperature over the period of five minutes, then hold the polymer in a 10° F. temperature band around this lower temperature for 120 minutes. While such a protocol can be accomplished and controlled on a laboratory scale test sample, it presents significant challenges in part production settings where the part is large. Accurately and rapidly cooling a large part of varying geometry and then halting that cooling is a significant challenge.

SUMMARY

According to present aspects, a method of preparing an oriented thermoplastic resin is disclosed, with the method comprising heating a thermoplastic resin to a predetermined temperature to generate a substantially melted thermoplastic resin. The thermoplastic resin comprises a first thermoplastic resin material having a first melting point and a second thermoplastic resin material having a second melting point, with the second thermoplastic resin material further comprising a ferromagnetic material, and wherein the predetermined temperature is a temperature that is at or above the first melting point and below the second melting point. The method further comprises applying a magnetic field to the substantially melted thermoplastic resin for a predetermined amount of time, and cooling the substantially melted thermoplastic resin to generate an oriented thermoplastic resin.

Another aspect of the present disclosure discloses a method of seeding crystal growth in a thermoplastic material comprising introducing a second thermoplastic material in a crystalline state as a seed material to a melted first thermoplastic resin material to form a seeded thermoplastic resin mixture, with the second thermoplastic resin material having a higher melting point than the first thermoplastic resin material, and with the second thermoplastic resin material comprising an amount of a ferromagnetic material that is responsive to a magnetic field at a magnetic flux density value ranging from about 0.1 T to about 1.T. A magnetic field is applied to the seeded thermoplastic resin mixture at a magnetic flux density value ranging from about 0.1 T to about 1 T, thereby orienting the second thermoplastic resin material relative to the magnetic field to form an oriented second thermoplastic resin material in the thermoplastic resin mixture. The seeded thermoplastic resin mixture is cooled to form crystal growth in the seeded thermoplastic resin mixture, with predetermined crystal growth oriented in the seeded thermoplastic resin mixture to form a substantially uniformly oriented thermoplastic resin, with the formed crystals of the first thermoplastic resin material aligned with the second thermoplastic resin material.

A further aspect of the present disclosure is directed to a thermoplastic resin comprising a first thermoplastic resin material having a first melting point and a second thermoplastic resin material having a second melting point. The second thermoplastic resin material comprises an amount of a ferromagnetic material, with the second thermoplastic resin material having a second melting point, and with the second thermoplastic resin material in a crystalline state. The second melting point exceeds the first melting point by a temperature difference ranging from about 10° F. to about 50° F., and the thermoplastic resin is in a substantially uniformly oriented crystalline state.

A further aspect of the present disclosure is directed to a thermoplastic resin mixture comprising a first thermoplastic resin material having a first melting point, and a second thermoplastic resin material having a second melting point, with the second thermoplastic resin material comprising an amount of ferromagnetic material. The second thermoplastic resin material is in a crystalline state. Further the second melting point exceeds the first melting point by a temperature difference ranging from about 10 F to about 50 F, and the resulting thermoplastic material mixture is in a substantially uniformly oriented state.

According to further aspects, the first thermoplastic material comprises an amount of polyether ether ketone and the second thermoplastic material comprises an amount of polyether ketone ketone and an amount of ferromagnetic material incorporated with the polyether ketone ketone, with the ferromagnetic material responsive to a magnetic force having a magnetic flux density ranging from about 0.1 T to about 1 T when the first thermoplastic material is in a melted state.

A further aspect of the present disclosure is directed to a composite material comprising a fiber matrix material impregnated with an oriented crystalline thermoplastic material, with the oriented crystalline thermoplastic material comprising an amount of ferromagnetic material, and with the ferromagnetic material responsive to a magnetic field having a magnetic flux density ranging from about 0.1 T to about 1 T.

In a further aspect, the oriented crystalline thermoplastic material comprises grain sizes ranging from about 10 μm to about 1 mm in length. If desired, the thermoplastic materials made according to aspects of the present disclosure can further range from about 1 mm to about 10 mm in length.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Figure 1A:
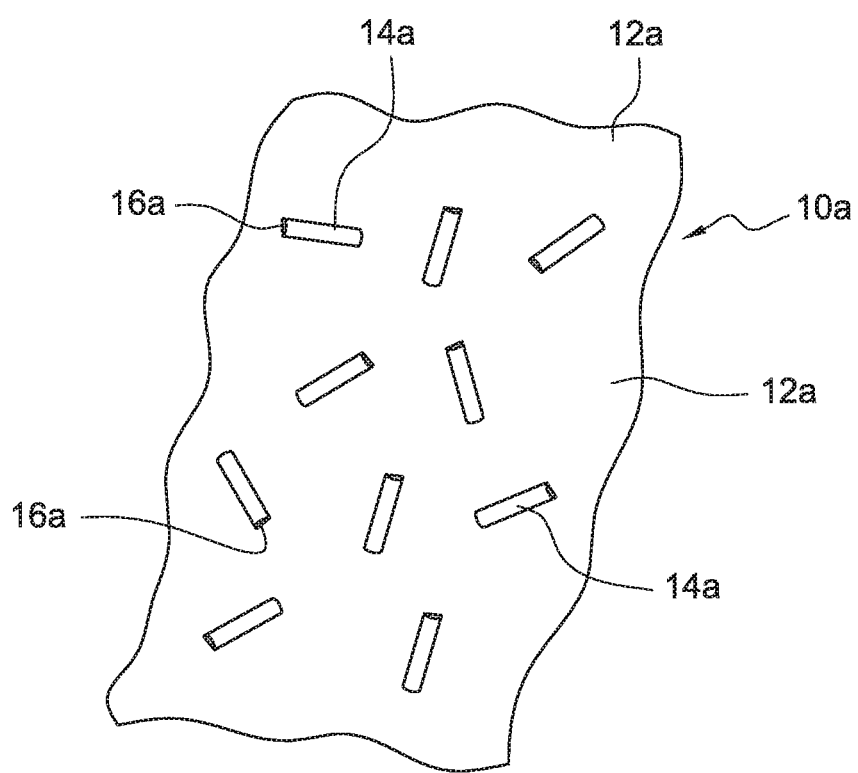
Figure 1B:
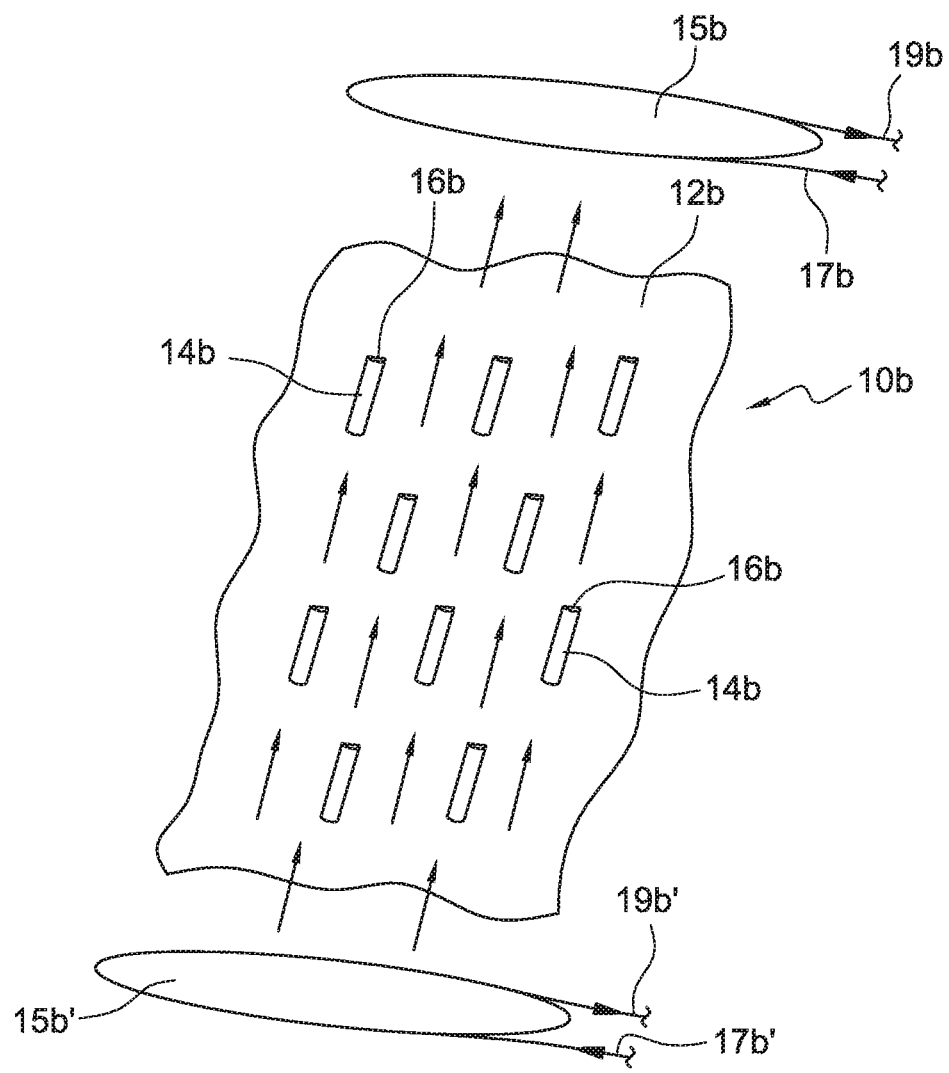
Figure 1C:
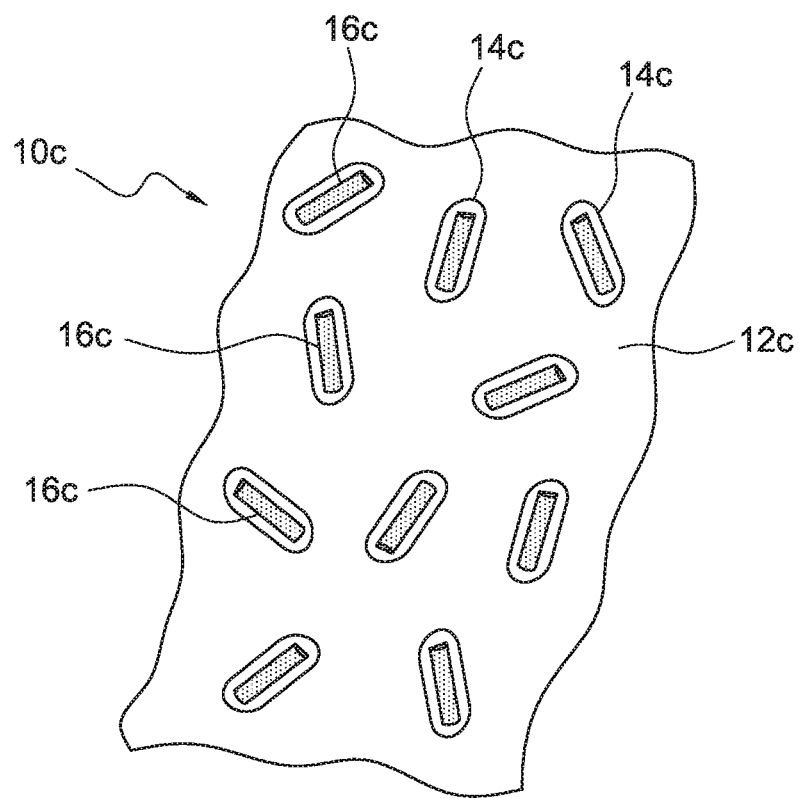
Figure 1D:
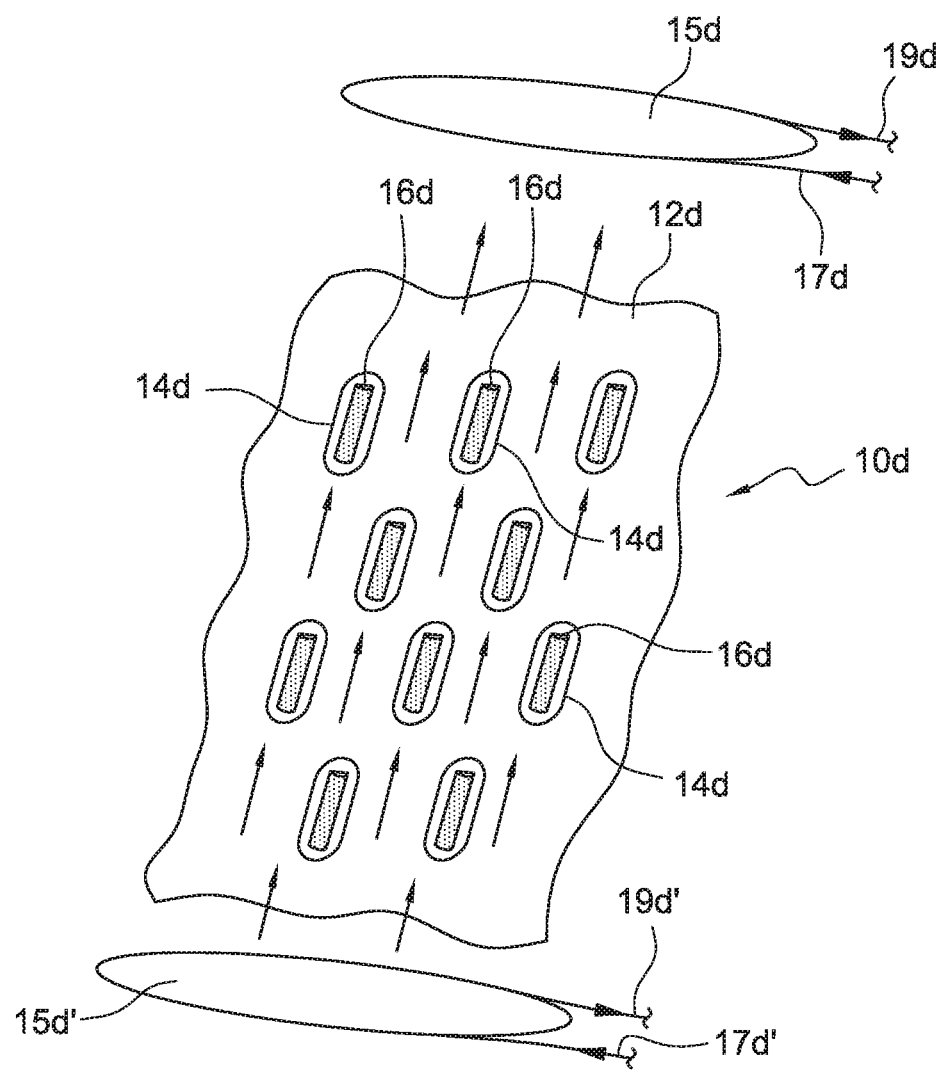
Figure 2:
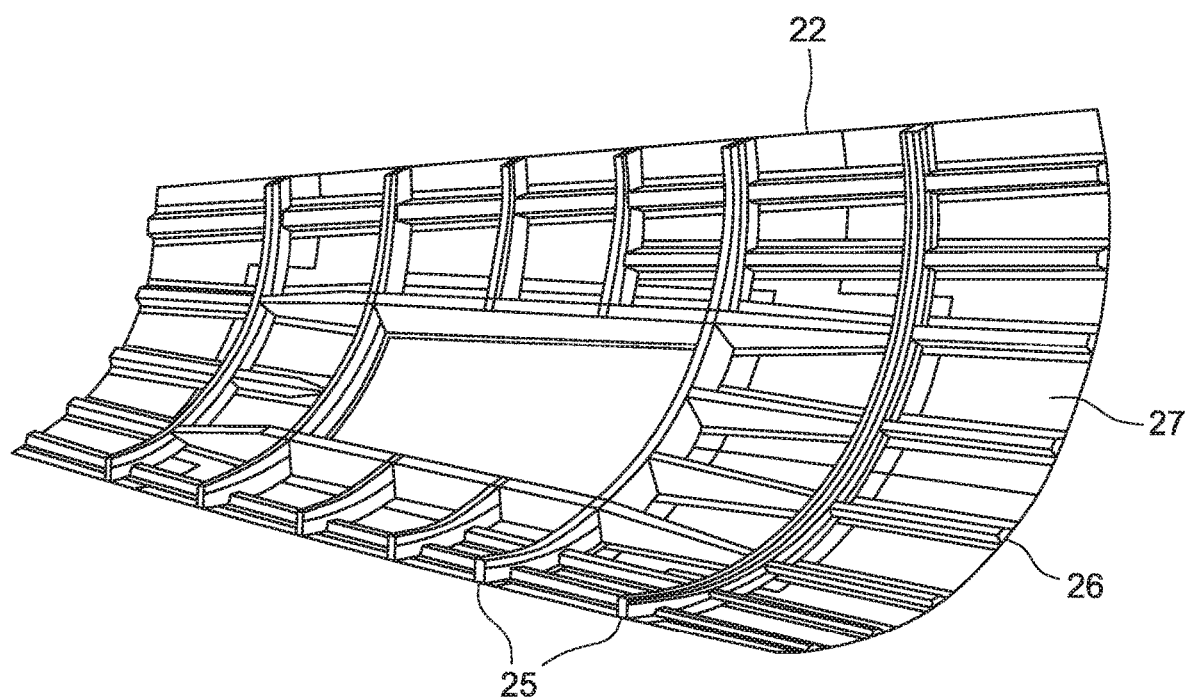
Figure 3:
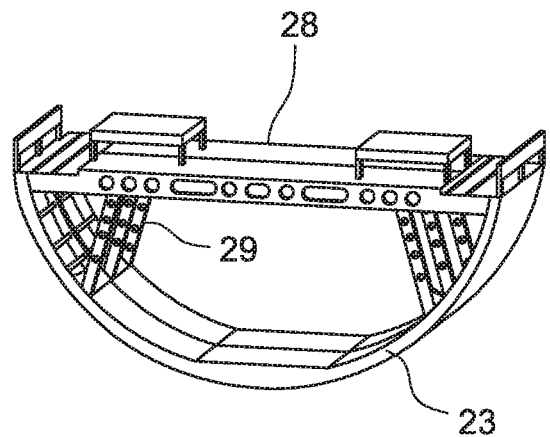
Figure 4:
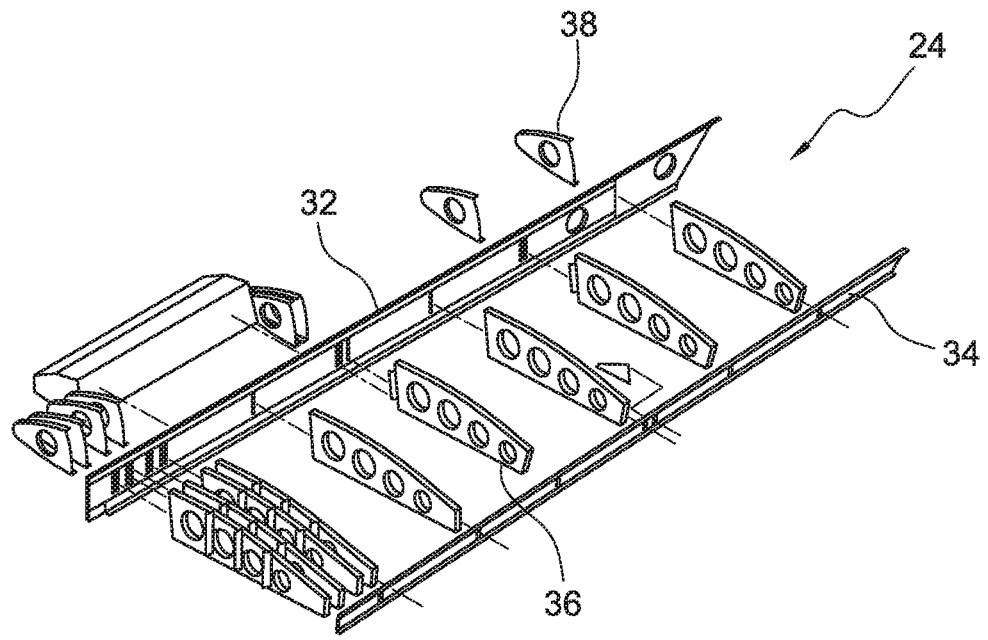

Having thus described variations of the disclosure in general terms, reference will now be made to the accompanying drawings, which are not necessarily drawn to scale, and wherein:

FIGS. 1A and 1C are representative illustrations of an aspect of the present disclosure showing thermoplastic seed particles (the second thermoplastic resin material) comprising ferromagnetic particles with the second thermoplastic resin material seed particles dispersed into a first thermoplastic resin material that is different from the second thermoplastic resin material;

FIGS. 1B and 1D are representative illustrations of an aspect of the present disclosure showing thermoplastic seed particles (the second thermoplastic resin material) comprising ferromagnetic particles, with the second thermoplastic resin material seed particles dispersed into a first thermoplastic resin material different from the second thermoplastic resin material (as shown in FIGS. 1A and 1C respectively), and with such second thermoplastic resin material seed particles comprising ferromagnetic particles oriented in a substantially uniform orientation in a magnetic field having a low magnetic flux density;

FIG. 2 is a perspective view of an exposed structural interior of a fuselage;

FIG. 3 is a perspective view of an exposed structural interior of a fuselage;

FIG. 4 is an exploded view of an interior of a wing assembly; and

Figure 5:
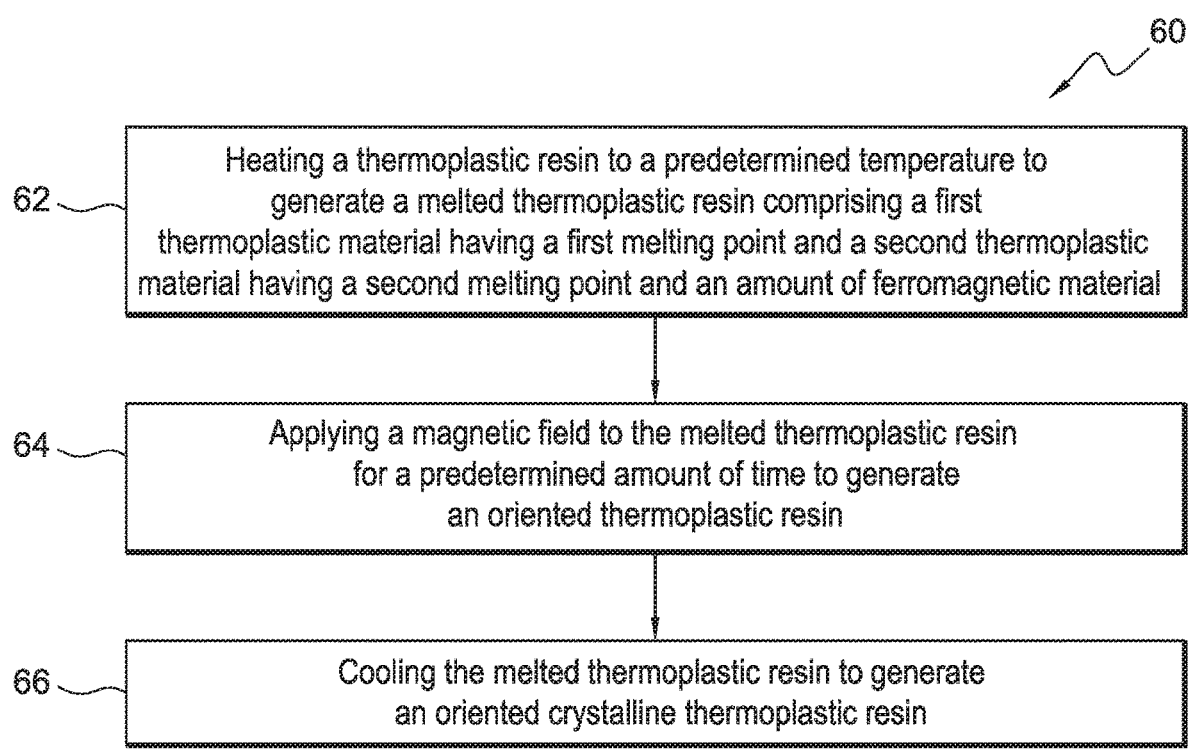
Figure 6:
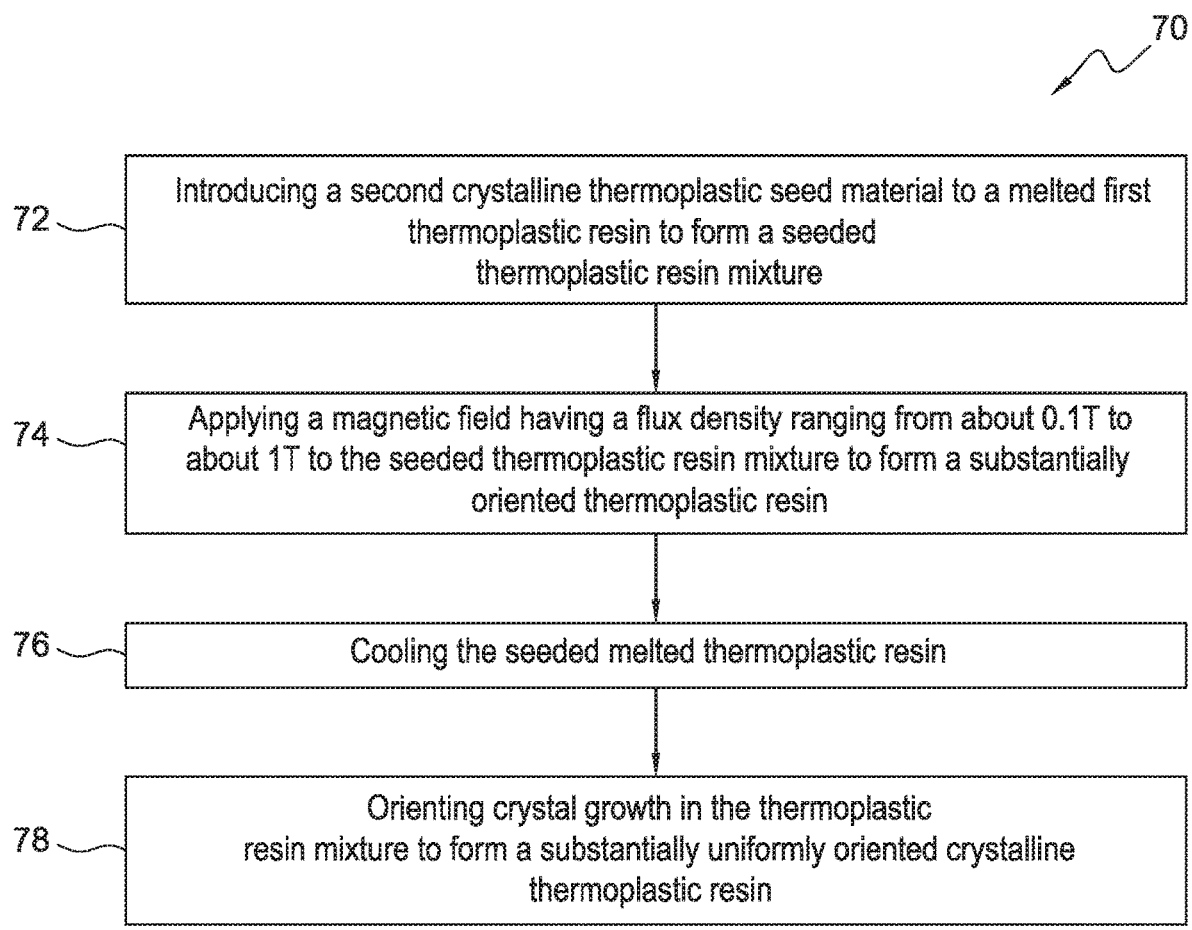

FIGS. 5 and 6 are flowcharts outlining aspects of the present disclosure.

DETAILED DESCRIPTION

In fiber matrix-based composite systems, according to aspects of the present disclosure, a composite crystalline thermoplastic resin is formed from the combining of one thermoplastic resin material (referred to herein as the "first" thermoplastic material) that is seeded with another thermoplastic resin material (referred to herein as the "second" thermoplastic material) that includes ferromagnetic microstructures, including ferromagnetic nanostructures (collectively equivalently referred to herein as "ferromagnetic particles" or "ferromagnetic material"). According to further aspects of the present disclosure, during the manufacture of a composite material, the addition of an amount of the second thermoplastic resin material comprising the ferromagnetic material into the first thermoplastic resin material occurs prior to resin infusion in the fiber-based matrix (e.g., before prepreg fabrication).

According to further aspects, the presently disclosed ferromagnetic particles are combined with the second thermoplastic resin material. The second thermoplastic resin material is maintained in a solid crystalline state and added to the melted first thermoplastic resin material as a crystalline seeding material to seed crystal growth in the first thermoplastic resin material, and the thermoplastic resin produced from the thermoplastic material mixture that is formed by the combined first and second thermoplastic resin materials.

Nucleation, as defined herein, is the process occurring in the formation of a crystalline structure as a material cools into a solid phase from a melted, liquid phase. According to the nucleation process, a small number of molecules from a seed material become arranged in a periodic pattern characteristic of a crystalline solid, forming a site upon which additional molecules join as the crystal grows. In heterogeneous nucleation processes, and according to aspects of the present disclosure, the surface of some different material (e.g., a second thermoplastic resin material), acts as the ferromagnetic particle-containing support or "seed" upon which molecules from a first thermoplastic resin material become oriented into a crystalline structure relative to the seed material. According to the present disclosure, the terms "nucleating" and "seeding" are referred to equivalently and are used interchangeably herein.

According to aspects of the present disclosure, thermoplastic resin material growth is predictably controlled for at least a two-component thermoplastic polymer system used to make a composite material. According to the present disclosure, a first thermoplastic polymer (alternately and equivalently referred to herein as a "first thermoplastic resin material") having a first melting point is subjected to a predetermined temperature that is at, or in excess, of the first melting point. A second thermoplastic polymer (alternately and equivalently referred to herein as a "second thermoplastic resin material") having a second melting point that is in excess of the predetermined temperature is presented into the first thermoplastic polymer, preferably when the first thermoplastic polymer is in a melted state. The second thermoplastic resin material comprises an amount of ferromagnetic material, such that the second thermoplastic resin material responds to a magnetic field having a desired magnetic flux density and when a magnetic field is applied, the second thermoplastic resin material is oriented in alignment relative to the magnetic field.

Ferromagnetic materials are magnetic materials having magnetic moments that arrange in domains of a similar magnetic direction. Ferromagnetic materials with a magnetic anisotropy are energetically constrained to having magnetic fields aligned parallel or anti-parallel to the direction of their magnetic anisotropy. A small particle of ferromagnetic material with a magnetic anisotropy will respond to a magnetic force by rotating, such that the magnetic anisotropy of the ferromagnetic material is aligned with the applied magnetic field. Therefore, according to aspects of the present disclosure, ferromagnetic materials having magnetic anisotropy are substantially uniformly oriented (e.g., volumetrically) along the direction of an applied, magnetic field.

According to aspects of the present disclosure, the second thermoplastic resin material comprises a material having a second melting point in excess of the predetermined temperature such that the second thermoplastic resin material is in the solid state during processing and seeding of the two-component thermoplastic polymer resin system. In particular, the second thermoplastic resin material "seeds" are in a crystalline state comprising a single domain, and the vector describing the crystallographic orientation of that domain is substantially parallel to the vector defining the magnetic anisotropy of the ferromagnetic material.

According to aspects of the present disclosure, when a magnetic field is applied to the second thermoplastic resin material comprising ferromagnetic particles having magnetic anisotropy, the second thermoplastic resin materials minimize energy by rotating to an orientation such that the magnetic anisotropy of the second thermoplastic resin material seeds is parallel and substantially uniformly oriented parallel relative to the direction of the applied magnetic field. Thus, in the presence of an applied magnetic field, the second thermoplastic resin material seed particles have the same crystallographic orientation.

According to an aspect of the present disclosure, the second thermoplastic resin material remains in a solid state and "seeds" the first thermoplastic resin material while the first thermoplastic resin material is in a melted state. When a low magnetic field ("low magnetic field" is defined herein as a magnetic flux density ranging from about 0.1 T to about 1 T) is applied to the thermoplastic resin mixture, the thermoplastic resin mixture, now comprising the ferromagnetic particles, substantially uniformly orients itself in response to and relative to the magnetic field such that, as the combined thermoplastic resin mixture (e.g., the thermoplastic resin mixture comprising the first and second thermoplastic resin materials) cools, crystal growth in the first thermoplastic resin material is predictably promoted in a substantially uniform and predetermined orientation throughout the thermoplastic material mixture.

According to further aspects of the present disclosure, the controlled and predetermined crystalline growth of the thermoplastic material mixture forms a polymer material with greatly reduced areas of grain boundaries, and further forms a material with predictable and controlled grain sizes comprising any practical desired range. In particular, when two adjacent grains grow to contact one another other, the adjacent grains form a single grain without a boundary, as their respective crystallographic orientations are the same. Grain sizes of the formed thermoplastic material, according to aspects of the present disclosure, preferably range from about 100 μm to about 1 mm in length. If desired, the grain sizes of the thermoplastic materials made according to aspects of the present disclosure can further range from about 1 mm to about 10 mm in length, or even to a length well in excess of 10 mm. Indeed, aspects of the present disclosure contemplate crystal growth according to the methods disclosed herein to any practical or desired length, including very long crystals up to and exceeding many meters in length.

According to aspects of the present disclosure, one method of fabricating small particles of ferromagnetic material and applying them to the second thermoplastic resin material is the Reverse Micelle synthesis. This technique involves mixing a metal salt (such as iron sulfate) and a surfactant in a hot bath, and adding more salt such that the metal supersaturates the solution. In that condition, dissociated metal ions aggregate into clusters, and surfactant molecules form reverse micelles around these clusters. While a micelle can be thought of as a static object, individual surfactant molecules detach from the micelle and are replaced by other molecules at a defined rate. This transient exposure of the aggregated metal to the bath enables the particle to grow through aggregation of more dissolved metal ions. This process ends as a collection of metal particles (e.g., metal particles of a monodispersed size such as, for example, particles having a diameter of about 4.3 nm) coated with surfactant, in a solvent solution. The ferromagnetic material can be separated from the solvent solution via filtering. According to aspects of the present disclosure, the ferromagnetic material produced is then mixed into a polymer melt with the second thermoplastic resin material to form ferromagnetic thermoplastic particles.

A substantially uniform orientation of the ferromagnetic thermoplastic particles, according to aspects of the present disclosure, is accomplished, according to one method, by providing shear force while cooling. The long molecules of the second thermoplastic resin material particles are stretched in the shear direction (e.g., orienting the second thermoplastic particles comprising the ferromagnetic material) so the second thermoplastic resin material particles crystallize preferentially and substantially uniformly in one direction as they cool. In this way, the relative orientation of the magnetic anisotropy of the second thermoplastic resin material comprising the ferromagnetic particles is controlled relative to the crystal formation direction. One effective method of cooling under shear is to spread a layer of the polymer melt on a cool, moving belt, resulting in a thin film of oriented polymers.

The present disclosure further contemplates the incorporation of ferromagnetic particles into thermoplastic materials that are not rod-like in configuration. For example, second thermoplastic resin material particles can fully or partially encapsulate, or otherwise substantially envelop the ferromagnetic particles. In this configuration, the ferromagnetic thermoplastic particles are elliptical (e.g., oval), or "rounded" (though not necessarily spherical) in shape. In this "rounded" particle configuration, a magnetic field is applied during cooling to rotate the ferromagnetic thermoplastic particles such that their orientations are substantially uniformly oriented (e.g., all ferromagnetic thermoplastic particles are substantially oriented in the same direction relative to the applied magnetic field), which is controlled with respect to the direction of the polymer orientation in the crystal by controlling the direction of the magnetic field with respect to the shear force applied to the polymer.

The resulting film or portions of crystallized second thermoplastic resin material containing the ferromagnetic particles is then processed to form seed particles. According to one aspect, ferromagnetic thermoplastic resin material polymers are ground into a fine powder of thermoplastic grains and are flowed past a magnet. Some powdered thermoplastic resin material grains will contain no ferromagnetic particles, and will proceed past the magnet undisturbed. The thermoplastic resin material grains containing ferromagnetic particles will be attracted towards the magnet, altering their flow path, and facilitating their separation. According to one aspect, the non-magnetized thermoplastic resin material grains can be melted and reused.

Another technique to produce seed crystals comprises forming a crystalline block of thermoplastic material, and then apply ferromagnetic particles to surfaces of the thermoplastic material, to "decorate" the surface of the thermoplastic resin material block with a ferromagnetic material by a method including, for example, vapor deposition. According to further methods, a mask and etching solution (including, e.g., photo etching) can be used to divide a thermoplastic resin material block into distinct seeds, with one end of the thermoplastic resin material block coated with ferromagnetic material particles.

The ferromagnetic thermoplastic resin material grains, according to aspects of the present disclosure, will become thermoplastic material seed particles in a multi-component (e.g., a two-component) thermoplastic resin material mixture (also referred to equivalently herein as a thermoplastic material system). The ferromagnetic thermoplastic resin grains are then added into the first thermoplastic resin material, preferably while the first thermoplastic resin material is in a melted state, at a temperature that is at or above the melting point of the first thermoplastic material and below the melting point of the second (ferromagnetic) thermoplastic resin material seed particles.

According to aspects of the present disclosure, the second thermoplastic resin material seed particles comprising ferromagnetic particles are introduced into the first, melted thermoplastic resin material according to any useful method for intermixing small particles. Such mixing methods include paint mixing protocols via shear mixing, for example. According to further aspects, it is desirable to have the resulting thermoplastic material mixture (e.g., in a temperature controlled chamber) at a substantially uniform temperature, to avoid high temperature "hot spots" that could cause the seed crystals (the ferromagnetic second thermoplastic resin material particles are equivalently referred to herein as the "seed crystals") to melt. Such undesired melting of the seed crystals may adversely impact their role in directing crystalline growth of the thermoplastic material mixture during cooling. For example, if the seed crystals are subjected to a temperature at or above their melting point, the seed crystals may not re-solidify to a desired crystalline state, or the crystal grain direction of the second thermoplastic resin seed material could be out of alignment relative to the magnetic anisotropy of the ferromagnetic particles and relative to the magnetic field.

According to aspects of the present disclosure, the ferromagnetic material particles can preferably include any material exhibiting a magnetic anisotropy in response to magnetic fields that are considered to be "low" magnetic fields having magnetic flux densities ranging from about 0.1 T to about 1.0 T. Ferromagnetic materials contemplated according to present aspects include magnetically "soft" materials such as annealed iron that can be magnetized but do not tend to stay magnetized. Such materials include iron, iron oxide, cobalt, nickel or iron-nickel alloys including, for example, permalloy. Permalloy is a nickel-iron magnetic alloy having a composition equivalent to about 80% nickel and about 20% iron. Other compositions of permalloy exist, often designated by the percentage of nickel in the alloy. Therefore, 45 permalloy refers to an alloy containing 45% nickel and 55% iron. Further, molybdenum permalloy is an alloy comprising 81% nickel, 17% iron and 2% molybdenum. For the purpose of the present disclosure, the term "permalloy" comprises all known nickel-iron alloys defined by the term "permalloy"

Various equipment can generate a desired magnetic field delivered at a desired magnetic field flux density, for example, according to aspects of the present disclosure, ranging from about 0.1 T to about 1.0 T. One such device capable of delivering such a desired magnetic field flux density is a Science First Electromagnet—200 lb capacity (School Specialty, Greenville Wis.). This electromagnet provides the desired magnetic flux density ranging from about 0.1 T to 1.0 T over some range of distance from the magnet inclusive of the range, ranging from about 0.5 cm to about 4.0 cm thickness of composite parts, when held over an Invar tool face plate. According to aspects of the present disclosure, the magnetic fields produced are efficient, and produced at a comparatively low cost, and can be easily integrated into the contemplated composite material manufacturing processes. The electromagnets, according to aspects of the present disclosure, generate a low magnetic field defined in terms of a low magnetic flux density ranging from about 0.1 T to about 1.0 T. The low magnetic flux densities produced in this range orient the second thermoplastic resin seed material (comprising the ferromagnetic material) in a substantially uniform orientation in and relative to the direction of the applied magnetic field to facilitate improved seeding of the crystal growth of the first thermoplastic resin material as it cools, without observing and imposing strict temperature cooling and heating regimens on the first thermoplastic resin material that would otherwise be required to achieve desired, yet inferior, crystal growth as compared to the presently described aspects.

The terms "substantially uniform orientation" and "substantially uniformly oriented" refer to the alignment of the second thermoplastic resin material seed (comprising the ferromagnetic material) in response and relative to the applied magnetic field. The second thermoplastic resin material seed particles move from a random orientation in the absence of a magnetic field, to an aligned orientation in and relative to the direction of an applied magnetic field. According to present aspects, as the two-component thermoplastic resin material system solidifies, the solidifying thermoplastic resin material mixture observes an energetically preferential orientation for the seeding polymer as crystallization occurs within the thermoplastic polymer system mixture, such that the resulting thermoplastic crystalline polymer aligns and forms as a solid thermoplastic polymer molecule crystalline structure.

According to present aspects, the protocols and regimens observed to facilitate desired crystal formation and growth in the first thermoplastic resin material produce significantly fewer grain boundaries, while achieving grain sizes ranging from about 10 µm to about 1 mm. Grain sizes larger than about 1 mm are also contemplated, including grain sizes ranging from about 1 mm up to 100 m. The reduced occurrences of grain boundaries in the composite materials formed, according to presently described aspects, yields a composite material having improved and desired characteristics, including improved strength and stiffness.

According to present aspects, the two-component thermoplastic polymer resin material mixture includes two different thermoplastic materials, with the two materials having varying melting points. The thermoplastic resin systems contemplated and generally thought to be useful for composite manufacturing include thermoplastic resins having a melting point at or exceeding about 600° F. According to aspects of the present disclosure, a thermoplastic resin material system comprises a first thermoplastic resin material having a first melting point, such that, when the first thermoplastic resin material is subjected to a predetermined processing temperature that is at, or in excess of, the first melting point, the first thermoplastic resin material melts. The second thermoplastic resin material comprising the ferromagnetic material is selected to have a melting point (i.e. the second thermoplastic resin material melting point) that is above the first melting point by a suitable temperature, for example, ranging from about 10° F. to about 50° F. higher than the first melting point. It is understood that the second thermoplastic resin material selected (and that includes the ferromagnetic particles), is selected to have a melting point (the second thermoplastic resin material melting point) that is greater than the first thermoplastic resin material melting point, and also greater than the selected processing temperature. In this way, according to aspects of the present disclosure, the second thermoplastic resin material melting point is greater than the processing temperature and greater than the first thermoplastic material melting point.

For example, thermoplastic polymer resin materials suitable for use as the first thermoplastic material having a first melting point include, for example, polyether ether ketone (PEEK) having a melting point of about 649° F., when, for example, the second thermoplastic resin material selected is polyether ketone ketone (PEKK) having a melting point of about 680° F., and the processing temperature to which the thermoplastic mixture is subjected, is equal to or higher than the first melting point (649° F.) and is also lower than the second melting point (680° F.), thus insuring that the second thermoplastic material does not melt.

In other examples, the first thermoplastic resin material can be PEKK when the processing temperature is higher than 680° F., but the processing temperature is also lower than the melting point of the second thermoplastic resin material (the ferromagnetic-containing thermoplastic material). In this example, a suitable second thermoplastic resin material could be polyphthalamide polymers having a melting point of at least about 700° F. One such polyphthalamide is PA 6T; a polyphthalamide having a 6T-segment and that melts at 700° F. In this example, when the thermoplastic mixture contains PEKK as the first thermoplastic resin material and polyphthalamide with ferromagnetic particles as the second thermoplastic resin material, and the first and second thermoplastic resin materials are combined together in the thermoplastic polymer mixture, the processing temperature is equal to or higher than 680° F., but is lower than 700° F. to insure that the second thermoplastic resin material does not melt.

According to present aspects, the second thermoplastic resin material comprising the ferromagnetic material (and used as a seeding material in the thermoplastic resin material mixture to seed the first thermoplastic resin material) will have a melting point that exceeds the melting point of the first thermoplastic resin material and the imposed predetermined processing temperature. Therefore, the second thermoplastic resin material will remain in a solid state. Since a very small amount (e.g., less than about 0.1 wt. %) of second thermoplastic resin material will be present in the system as a seeding material, the overall thermoplastic mixture is considered to be in a predominantly melted state and is equivalently referred to herein as being in a "melted state", while recognizing that the second thermoplastic resin material does not melt.

While being bound to no particular theory, aspects of the present disclosure are directed to forming a thermoplastic material and growing thermoplastic crystals that possess a minimum number and amount of grain boundaries. To form such a material by seeding one thermoplastic material with a second thermoplastic seed material, it is believed to be desirable that the first and second thermoplastic materials have a similar chemical "backbone" structure in the thermoplastic polymer. A chemical structure "backbone" is understood to refer to the repeating chemical structures or "units" along a polymeric chain. Polymers that share similarities in their chemical structure "backbone" will share certain chemical characteristics including melting points and melting point ranges. In addition, the aligned, crystalline molecules of the second thermoplastic resin material form a surface on which it is energetically favorable for the first thermoplastic resin material to crystallize, as the first thermoplastic material cools from the processing temperature. As adjacent grains of the first thermoplastic material grow to contact one another, they form a single grain, without a boundary, as their respective crystallographic orientations are the same.

According a present aspect, the first and second thermoplastic resin materials are selected to have meting points relative to one another that are within a temperature range differential ranging from about 10° F. to about 50° F. A predetermined processing temperature is then selected to be equal to or higher than the first thermoplastic resin material melting point, but lower than the melting point of the second thermoplastic resin material.

FIGS. 1A and 1B are representative drawings of two-component thermoplastic resin systems. In FIG. 1A a two-component thermoplastic resin system 10a is shown comprising a first thermoplastic resin ("seed") material 12a in a melted state, and a second thermoplastic resin material 14a is shown in a solid and crystalline state. Second thermoplastic resin material 14a is shown in a rod-like particulate form and including a ferromagnetic material 16a located on one end of the second thermoplastic resin material 14a. As shown in FIG. 1A, the second thermoplastic resin material has a random orientation as it seeds the first thermoplastic resin material 12a.

FIG. 1B is a representative drawing of the two-component thermoplastic resin system of FIG. 1A, with the two-component thermoplastic resin system 10a now shown as a "magnetized" two-component thermoplastic resin system 10b with a magnetic field indicated by the "arrows" shown in FIGS. 1B and 1D, and having an magnetic flux density ranging from about 0.1 T to about 1.0 T applied to the thermoplastic resin system 10b. As shown in FIG. 1B, the first thermoplastic resin material 12b is shown in a melted state, and a second "magnetized" thermoplastic resin ("seed") material 14b is shown in a solid and crystalline state. Magnetized second thermoplastic resin material 14b is again shown as having a rod-like particulate form and includes a magnetized ferromagnetic material 16b located on one end of the magnetized second thermoplastic resin material 14b. When a magnetic field (indicated by "arrows" in FIG. 1B) is applied to the two-component thermoplastic resin system 10b, the magnetized second thermoplastic resin material 14b responds to the magnetic field by aligning in a substantially uniform orientation relative to the applied magnetic field. As shown in FIG. 1B, the magnetic field applied to the thermoplastic resin system 10b is formed between magnetic field generating systems, such as electromagnets 15b, 15b' with current provided into the electromagnets by current inlets 17b, 17b' and out of the electromagnets by current outlets 19b, 19b'.

While the second thermoplastic resin material materials 14a, 14b are shown in FIGS. 1A and 1B, respectively, as "rod-like" or elongated cylindrical structures or particles, it is understood that the second thermoplastic resin material 14a and 14b may be particles having any suitable dimension and geometry, so long as the overall content of the second thermoplastic resin material, by weight percent (wt. %) does not adversely impact the desired characteristics of the final thermoplastic resin material system product. In addition, although the diameters of the second thermoplastic resin material particles appear substantially similar, the diameters may vary relative to one another.

FIGS. 1C and 1D are representative drawings of two-component thermoplastic resin systems. As shown in FIG. 1C, the two component thermoplastic resin system 10c comprises a first thermoplastic resin material 12c in a melted state, and a second thermoplastic resin material 14c is shown in a solid and crystalline state. Second thermoplastic resin material 14c is shown encapsulating, or substantially enveloping a rod-like ferromagnetic material 16c. As shown in FIG. 1C, the second thermoplastic resin material has a random orientation.

FIG. 1D is a representative drawing of the two-component thermoplastic resin system shown in FIG. 1C with the two-component thermoplastic resin system 10c of FIG. 1C now shown as a "magnetized" two-component thermoplastic resin system 10d with a magnetic field having a magnetic flux density ranging from about 0.1 T to about 1.0 T applied to the thermoplastic resin system 10d. As shown in FIG. 1D, the first thermoplastic resin material 12d is shown in a melted state, and a second thermoplastic resin material 14d is shown in a solid and crystalline state. Second thermoplastic resin material 14d is shown encapsulating, or substantially enveloping a rod-like ferromagnetic material 16d. When a magnetic field is applied to the two-component thermoplastic resin system 10d (as indicated by "arrows" in FIG. 1D), the second thermoplastic resin material responds to the magnetic field by aligning in a substantially uniform orientation relative to the applied magnetic field (as indicated by "arrows"). As shown in FIG. 1D, the magnetic field applied to the thermoplastic resin system 10d is formed between magnetic field generating systems, such as electromagnets 15d, 15d' with current provided into the electromagnets by current inlets 17d, 17d' and out of the electromagnets by current outlets 19d, 19d'.

While the second thermoplastic resin materials 14c and 14d are shown in FIGS. 1C and 1D, respectively, as substantially "oval", it is understood that the second thermoplastic resin material 14c and 14d may be particles of any suitable geometry or geometries. While the ferromagnetic material 16c and 16d encapsulated within the second thermoplastic resin material particles 14c and 14d, respectively, are shown in a "rod-like" or elongated cylindrical form, the ferromagnetic material may be particles of any dimensions or geometries, so long as the second thermoplastic resin material 14c and 14d responds substantially similarly to an applied magnetic field such that they orient themselves substantially similarly relative to the direction of an applied magnetic field.

According to present aspects, the amount of ferromagnetic material combined with the amount of the second-thermoplastic resin seed material is provided at amounts of less than 1.0 wt. % of the combined first thermoplastic and second thermoplastic resin material mixture. More preferably, the wt. % of the second thermoplastic resin seed material introduced to the first thermoplastic resin material ranges from about 0.1 wt. % to about $1 \times 10^{-6}$ wt. % of the combined thermoplastic mixture. According to one aspect, the second thermoplastic resin seed material has a particle size ranging from about 100 nm to about 200 nm. According to another aspect, the particle size of the ferromagnetic material incorporated into the second thermoplastic resin material used as the seed material ranges from about 3 nm to about 5 nm in diameter and from about 1 μm to about 3 μm in length.

The following Examples further illustrate aspects of the present methods and resulting thermoplastic resin materials made according to aspects of the present disclosure.

Example 1

PEEK (650° F. MP)/PEKK 680° F. MP)

Polyether ketone ketone (PEKK), in a liquid state at 700° F. is poured into a shear mixer at 60 s$^{-1}$. Iron oxide particles ($Fe_3O_4$) are added to form a 2 wt % mixture of iron oxide in PEKK. The PEKK mixture is expelled from the mixer onto a belt maintained at 700° F. at the location of fluid impingement, with the belt moving faster than the flow of the mixture to cause shear alignment of molecules. The belt moves the PEKK mixture into a region of controlled cooling enabling the gradual formation of crystals in the PEKK, preferentially aligned with the aligned molecule direction. The expelling location and controlled cooling region also contain magnets producing magnetic field aligned with the direction of belt motion, which is the direction of PEKK molecular alignment and thus crystalline direction, causing the iron oxide particles to rotate in the PEKK prior to PEKK solidification, to align the iron oxide particle magnetic anisotropy with the future crystalline direction of the polymer. The solidified film is expressed by the belt over a breaking apparatus that breaks the polymer film into pieces that subsequently fall into a chute as the belt turns over a roller to return towards the fluid expeller. Inside the chute, the polymer pieces are pulverized and the resulting dust is dropped into collectors. A magnet placed between the pulverizer and the collectors deflects the falling path of the polymer mix particles that contain iron oxide particles, to separate those PEKK mixture particles from the particles that contain no iron oxide.

Polyether ether ketone (PEEK), in a liquid state at 650° F., is added to a shear mixer at 40 s$^{-1}$. PEKK mixture particles containing iron oxide are added to the PEEK to form 0.1 wt % PEKK (modified) in PEEK. The two-polymer mixture is infused into a bed of carbon fibers to produce a thermoplastic composite film prepreg. The prepreg is allowed to cool without any particular control.

Two-polymer mixture prepreg is laminated to form a part of useful shape. Two-polymer mixture prepreg is controllably heated to 650° F. to melt the PEEK without melting the PEKK crystal seeds. A magnetic field is applied to rotate the iron particles bound in PEKK such that the magnetic anisotropy axis of the iron particle are oriented in the direction of the magnetic field, which orients the crystallographic orientation direction of the PEKK seed in the same direction.

Under the influence of this magnetic field, the two-polymer mixture is cooled at a rate of 2° F./min to a temperature of 620° F. and held at 620° F. for 60 minutes. During this cooling process, the solidifying PEEK preferentially forms crystals on the nucleating surfaces of the PEKK seeds, oriented in the same direction as the PEKK seeds. As the PEEK crystals grow, wherever two crystal grains contact one another, the grains merge into a single grain due to their crystallographic alignment.

Once crystallization is complete, the solid two-polymer composite material part is allowed to cool to room temperature without a particular temperature control or temperature cooling rate required.

Example 2

PEKK (680° F. MP)/PA 6T (700° F. MP)

PA 6T, a polyphthalamide having a 6T-Segment, in a liquid state at 740° F. is poured into a shear mixer at 60 s$^{-1}$. Iron oxide particles ($Fe_3O_4$) are added to form a 2 wt. % mixture of iron oxide in PA 6T. The PA 6T mixture is expelled from the mixer onto a belt maintained at 740° F. at the location of fluid impingement, with the belt moving faster than the flow of the mixture to cause shear alignment of molecules. The belt moves the PA 6T mixture into a region of controlled cooling enabling the gradual formation of crystals in the PA 6T, preferentially aligned with the aligned molecule direction. The expelling location and controlled cooling region also contain magnets producing magnetic field aligned with the direction of belt motion, which is the direction of PA 6T molecular alignment and thus crystalline direction, causing the iron oxide particles to rotate in the PA 6T prior to PA 6T solidification, to align the iron oxide particle magnetic anisotropy with the future crystalline direction of the polymer. The solidified film is expressed by the belt over a breaking apparatus that breaks the polymer film into pieces that subsequently fall into a chute as the belt turns over a roller to return towards the fluid expeller. Inside the chute, the polymer pieces are pulverized and the resulting dust is dropped into collectors. A magnet placed between the pulverizer and the collectors deflects the falling path of the polymer mix particles that contain iron oxide particles, to separate those PA 6T mixture particles from the particles that contain no iron oxide.

PEKK, in a liquid state at 700° F., is added to a shear mixer at 40 s$^{-1}$. PA 6T mixture particles containing iron oxide are added to the PEKK to form 0.1 wt % PA 6T (modified) in PEKK. The two-polymer mixture is infused into a bed of carbon fibers to produce a thermoplastic composite film prepreg. The prepreg is allowed to cool without any particular control.

Two-polymer mixture prepreg is laminated to form a part of useful shape. Two-polymer mixture prepreg is controllably heated to 700° F. to melt the PEKK without melting the PA 6T crystal seeds. A magnetic field is applied to rotate the iron particles bound in PA 6T such that the magnetic anisotropy axis of the iron particles is oriented in the direction of the magnetic field, which orients the crystallographic orientation direction of the PA 6T seeds in the same direction.

Under the influence of this magnetic field, the two-polymer mixture is cooled at a rate of 2° F./min to a temperature of 670° F. and held at 670° F. for 60 minutes. During this cooling process, the solidifying PEKK preferentially forms crystals on the nucleating surfaces of the PA 6T seeds, oriented in the same direction as the PA 6T seeds. As the PEKK crystals grow, wherever two crystal grains contact one another, the grains merge into a single grain due to their crystallographic alignment. Once crystallization is complete, the solid two-polymer composite material part is allowed to cool to room temperature without detailed temperature control or cooling rate required.

Example 3

Isotactic Polypropylene (320° F. MP)/Polyvinyl fluoride (340° F. MP)

Polyvinyl fluoride (PVF), in a liquid state at 360° F. is poured into a shear mixer at 60 s$^{-1}$. Iron oxide particles (Fe$_3$O$_4$) are added to form a 2 wt % mixture of iron oxide in PVF. The PVF mixture is expelled from the mixer onto a belt maintained at 360° F. at the location of fluid impingement, with the belt moving faster than the flow of the mixture to cause shear alignment of molecules. The belt moves the PVF mixture into a region of controlled cooling enabling the gradual formation of crystals in the PVF, preferentially aligned with the aligned molecule direction. The expelling location and controlled cooling region also contain magnets producing magnetic field aligned with the direction of belt motion, which is the direction of PVF molecular alignment and thus crystalline direction, causing the iron oxide particles to rotate in the PVF prior to PVF solidification, to align the iron oxide particle magnetic anisotropy with the future crystalline direction of the polymer. The solidified film is expressed by the belt over a breaking apparatus that breaks the polymer film into pieces that subsequently fall into a chute as the belt turns over a roller to return towards the fluid expeller. Inside the chute, the polymer pieces are pulverized and the resulting dust is dropped into collectors. A magnet placed between the pulverizer and the collectors deflects the falling path of the polymer mix particles that contain iron oxide particles, to separate those PVF mixture particles from the particles that contain no iron oxide.

Isotactic polypropylene (PP), in a liquid state at 340° F., is added to a shear mixer at 40 s$^{-1}$. PVF mixture particles containing iron oxide are added to the PP to form 0.1 wt % PVF (modified) in PP. The two-polymer mixture is infused into a bed of carbon fibers to produce a thermoplastic composite film prepreg. The prepreg is allowed to cool without any particular control.

Two-polymer mixture prepreg is laminated to form a part of useful shape. Two-polymer mixture prepreg is controllably heated to 340° F. to melt the PP without melting the PVF crystal seeds. A magnetic field is applied to rotate the iron particles bound in PVF such that the magnetic anisotropy axis of the iron particle are oriented in the direction of the magnetic field, which orients the crystallographic orientation direction of the PVF seed in the same direction.

Under the influence of this magnetic field, the two-polymer mixture is cooled at a rate of 2° F./min to a temperature of 320° F. and held at 320° F. for 60 minutes. During this cooling process, the solidifying PP preferentially forms crystals on the nucleating surfaces of the PVF seeds, oriented in the same direction as the PVF seeds. As the PP crystals grow, wherever two crystal grains contact one another, the grains merge into a single grain due to their crystallographic alignment. Once crystallization is complete, the solid two-polymer composite material part is allowed to cool to room temperature without a particular temperature cooling rate or temperature control required.

Example 4

Syndiotactic Polystyrene (PS) (518° F. MP)/Polyphenylene Sulfide (PPS) (532° F. MP)

Polyphenylene sulfide (PPS), in a liquid state at 550° F. is poured into a shear mixer at 60 s$^{-1}$. Iron oxide particles (Fe$_3$O$_4$) are added to form a 2 wt % mixture of iron oxide in PSS. The PPS mixture is expelled from the mixer onto a belt maintained at 550° F. at the location of fluid impingement, with the belt moving faster than the flow of the mixture to cause shear alignment of molecules. The belt moves the PPS mixture into a region of controlled cooling enabling the gradual formation of crystals in the PPS, preferentially aligned with the aligned molecule direction. The expelling location and controlled cooling region also contain magnets producing magnetic field aligned with the direction of belt motion, which is the direction of PPS molecular alignment and thus crystalline direction, causing the iron oxide particles to rotate in the PPS prior to PPS solidification, to align the iron oxide particle magnetic anisotropy with the future crystalline direction of the polymer. The solidified film is expressed by the belt over a breaking apparatus that breaks the polymer film into pieces that subsequently fall into a chute as the belt turns over a roller to return towards the fluid expeller. Inside the chute, the polymer pieces are pulverized and the resulting dust is dropped into collectors. A magnet placed between the pulverizer and the collectors deflects the falling path of the polymer mix particles that contain iron oxide particles, to separate those PPS mixture particles from the particles that contain no iron oxide.

Syndiotactic polystyrene (PS), in a liquid state at 525° F., is added to a shear mixer at 40 s$^{-1}$. PPS mixture particles containing iron oxide are added to the PS to form 0.1 wt % PPS (modified) in PS. The two-polymer mixture is infused into a bed of carbon fibers to produce a thermoplastic composite film prepreg. The prepreg is allowed to cool without any particular control.

Two-polymer mixture prepreg is laminated to form a part of useful shape. Two-polymer mixture prepreg is controllably heated to 525° F. to melt the PS without melting the PPS crystal seeds. A magnetic field is applied to rotate the iron particles bound in PPS such that the magnetic anisotropy axis of the iron particle are oriented in the direction of the magnetic field, which orients the crystallographic orientation direction of the PPS seed in the same direction.

Under the influence of this magnetic field, the two-polymer mixture is cooled at a rate of 2° F./min to a temperature of 500° F. and held at 500° F. for 60 minutes. During this cooling process, the solidifying PS preferentially forms crystals on the nucleating surfaces of the PPS seeds, oriented in the same direction as the PPS seeds. As the PS crystals grow, wherever two crystal grains contact one another, the grains merge into a single grain due to their crystallographic alignment. Once crystallization is complete, the solid two-polymer composite material part is allowed to cool to room temperature without a particular temperature cooling rate or temperature control required.

Example 5

Nylon (509° F. MP)/Syndiotactic Polystyrene (PS) (518° F. MP)

Syndiotactic polystyrene (PS), in a liquid state at 540° F. is poured into a shear mixer at 60 s$^{-1}$. Iron oxide particles ($Fe_3O_4$) are added to form a 2 wt % mixture of iron oxide in PS. The PS mixture is expelled from the mixer onto a belt maintained at 540° F. at the location of fluid impingement, with the belt moving faster than the flow of the mixture to cause shear alignment of molecules. The belt moves the PS mixture into a region of controlled cooling enabling the gradual formation of crystals in the PS, preferentially aligned with the aligned molecule direction. The expelling location and controlled cooling region also contain magnets producing magnetic field aligned with the direction of belt motion, which is the direction of PS molecular alignment and thus crystalline direction, causing the iron oxide particles to rotate in the PS prior to PS solidification, to align the iron oxide particle magnetic anisotropy with the future crystalline direction of the polymer. The solidified film is expressed by the belt over a breaking apparatus that breaks the polymer film into pieces that subsequently fall into a chute as the belt turns over a roller to return towards the fluid expeller. Inside the chute, the polymer pieces are pulverized and the resulting dust is dropped into collectors. A magnet placed between the pulverizer and the collectors deflects the falling path of the polymer mix particles that contain iron oxide particles, to separate those PS mixture particles from the particles that contain no iron oxide.

Nylon, in a liquid state at 510° F., is added to a shear mixer at 40 s$^{-1}$. PS mixture particles containing iron oxide are added to the Nylon to form 0.1 wt % PS (modified) in Nylon. The two-polymer mixture is infused into a bed of carbon fibers to produce a thermoplastic composite film prepreg. The prepreg is allowed to cool without any particular control.

Two-polymer mixture prepreg is laminated to form a part of useful shape. Two-polymer mixture prepreg is controllably heated to 510° F. to melt the Nylon without melting the PS crystal seeds. A magnetic field is applied to rotate the iron particles bound in PS such that the magnetic anisotropy axis of the iron particle are oriented in the direction of the magnetic field, which orients the crystallographic orientation direction of the PS seed in the same direction.

Under the influence of this magnetic field, the two-polymer mixture is cooled at a rate of 2° F./min to a temperature of 490° F. and held at 490° F. for 60 minutes. During this cooling process, the solidifying Nylon preferentially forms crystals on the nucleating surfaces of the PS seeds, oriented in the same direction as the PS seeds. As the Nylon crystals grow, wherever two crystal grains contact one another, the grains merge into a single grain due to their crystallographic alignment. Once crystallization is complete, the solid two-polymer composite material part is allowed to cool to room temperature without a particular temperature cooling rate or temperature control required.

According to further aspects of the present disclosure, the thermoplastic resin materials disclosed here can be incorporated into fiber-containing composite systems and otherwise used to impregnate the fiber components present in various composite material systems. Such composite systems include carbon fiber reinforced plastics (CFRPs), as well as composite material systems that include, for example, boron fibers, glass fibers, aramid fibers, etc.

In addition, aspects of the present disclosure further contemplate the use of the resulting thermoplastic resin materials as composite materials that do not incorporate a fiber matrix. For such non-fiber composite materials and systems, the seed particles (e.g., the second thermoplastic resin material with the ferromagnetic particles) may be sized to range from about 10 μm to about 100 μm, as compared to a smaller seed particle size e.g., of about 100 nm to about 200 nm) that is contemplated for use in composite materials having a fiber matrix, according to aspects of the present disclosure.

The disclosed apparatuses, systems and methods for manufacturing thermoplastic resin materials further contemplate composite materials incorporating the present thermoplastic resins, components comprising the composite materials, as well as objects comprising the components comprising the thermoplastic resin materials. Such objects include, for example, stationary objects, including buildings, supports for buildings etc., as well as mobile structures. Such mobile structure include a vehicle, including, for example, a manned aircraft, an unmanned aircraft, a manned spacecraft, an unmanned spacecraft, a manned rotorcraft, an unmanned rotorcraft, a manned terrestrial vehicle, an unmanned terrestrial vehicle, a manned surface water borne vehicle, an unmanned surface water borne vehicle, a manned sub-surface water borne vehicle, an unmanned sub-surface water borne vehicle, a satellite, etc.

The thermoplastic resin materials disclosed herein can be used to fabricate, for example, primary structures and secondary structures such as, for example such structures found in the aforementioned vehicles. As shown in FIG. 2, the interior of a fuselage section 22 of, for example, an aircraft, that comprises frames 25, stringers 26, skins 27 and other components that can be made from composite materials comprising the resulting crystalline thermoplastic resin materials disclosed herein. FIG. 3 shows floor beams 28, struts 29, and frames 23 that can be made from composites comprising the disclosed thermoplastic resin material disclosed herein. Further, FIG. 4 shows an internal view of wing section 24 comprising wing spar 32 and rear wing spar channel 34, (that are, for example, connected by wing ribs 36) and nose ribs 38 that can be made from composites comprising the disclosed thermoplastic resin material disclosed herein. Additional structures including, spars flap fairings, system brackets, electrical raceway brackets and splice straps, etc. may be made from composites comprising the crystalline thermoplastic resin materials disclosed herein.

FIGS. 5 and 6 are flowcharts outlining contemplated methods according to aspects of the present disclosure. As outlined in FIG. 5, method 60 includes heating 62 a thermoplastic resin mixture to a predetermined temperature to generate a melted thermoplastic resin mixture. The thermoplastic resin mixture comprises a first thermoplastic resin material that has a first melting point mixed with a second thermoplastic material having a second melting point, with the second thermoplastic resin material comprising an amount of a ferromagnetic material. Method 60 further includes applying 64 a magnetic field to the melted thermoplastic resin mixture for a predetermined amount of time to generate and form a an oriented thermoplastic resin, and cooling 66 the melted thermoplastic resin system to generate an oriented crystalline thermoplastic resin.

FIG. 6 outlines a further method 70 according to aspects of the present disclosure comprising introducing 72 a second thermoplastic resin material as a seed material and in a crystalline state to a melted first thermoplastic resin material to form a seeded thermoplastic resin mixture. Method 70 further includes applying 74 a magnetic field having a magnetic flux density ranging from about 0.1 T to about 1.0 T to orient the seeded thermoplastic resin mixture to form a substantially uniformly oriented thermoplastic resin, followed by cooling 76 the seeded thermoplastic resin mixture to form a substantially uniformly oriented crystalline thermoplastic resin, and orienting 78 crystal growth in the seeded thermoplastic resin mixture to form a substantially uniformly oriented crystalline thermoplastic resin product.

The presently disclosed aspects may, of course, be carried out in other ways than those specifically set forth herein without departing from essential characteristics of the presently disclosed aspects. The present aspects are to be considered in all respects as illustrative and not restrictive, and all changes coming within the meaning and equivalency range of the appended claims are intended to be embraced therein.

What is claimed is:

1. A method of preparing an oriented thermoplastic resin, the method comprising:
   heating a thermoplastic resin to a predetermined temperature to generate a melted thermoplastic resin, said thermoplastic resin comprising:
      a first thermoplastic resin material having a first melting point; and
      a second thermoplastic resin material having a second melting point;
   wherein said second thermoplastic resin material is in a crystalline state and said second thermoplastic resin material further comprises a ferromagnetic material; and
   wherein the predetermined temperature is a temperature that is at or above the first melting point and below the second melting point;
   applying a magnetic field to the melted thermoplastic resin for a predetermined amount of time; and
   cooling the melted thermoplastic resin to form the oriented thermoplastic resin.

2. The method of claim 1, further comprising:
   orienting the second thermoplastic resin material in alignment relative to the magnetic field;
   wherein the step of orienting is substantially coincident with the step of applying a magnetic field.

3. The method of claim 1, wherein the step of cooling the melted thermoplastic resin, further comprises:
   forming crystals in the first thermoplastic resin material, wherein said crystals are aligned relative to the second thermoplastic resin material.

4. The method of claim 1, wherein the ferromagnetic material comprises at least one of: iron, iron oxide, cobalt, nickel, and permalloy.

5. The method of claim 1, wherein the second melting point is greater than the first melting point by a temperature difference between the first melting point and the second melting point, said temperature difference ranging from about 10° F. to about 50° F.

6. The method of claim 1, wherein the second thermoplastic resin material substantially encapsulates the ferromagnetic material.

7. The method of claim 1, wherein, in the step of cooling the melted thermoplastic resin to form an oriented thermoplastic resin, the oriented thermoplastic resin crystallizes to a substantially uniform orientation.

8. The method of claim 1, further comprising:
   nucleating the first thermoplastic resin material with the second thermoplastic resin material;
   wherein the step of nucleating precedes the step of applying a magnetic field to the melted thermoplastic resin for a predetermined amount of time.

9. The method of claim 1, wherein the step of cooling the melted thermoplastic resin to form the oriented thermoplastic resin further comprises:
   forming a thermoplastic resin having grain sizes ranging from about 100 µm to about 1 mm.

10. The method of claim 1, wherein the step of cooling the melted thermoplastic resin to form the oriented thermoplastic resin further comprises:
    forming a thermoplastic resin having grain sizes ranging from about 1 mm to about 10 mm.

11. The method of claim 1, wherein the step of applying a magnetic field to the melted thermoplastic resin further comprises:
    applying the magnetic field to the melted thermoplastic resin at a magnetic flux density ranging from about 0.1 T to about 1 T.

12. A thermoplastic resin made according to the method of claim 1.

13. A composite material comprising a thermoplastic resin made according to the method of claim 1.

14. A method of seeding crystal growth in a seeded thermoplastic resin, the method comprising:
    introducing a second thermoplastic resin material in a crystalline state to a first thermoplastic resin material to form a seeded thermoplastic resin mixture, said second thermoplastic resin material having a higher melting point than the first thermoplastic resin material, and said second thermoplastic resin material comprising an amount of a ferromagnetic material that is responsive to a magnetic flux density ranging from about 0.1 T to about 1T;
    applying a magnetic field having a magnetic flux density ranging from about 0.1T to about 1T to the seeded thermoplastic resin mixture, thereby orienting the second thermoplastic resin material relative to the magnetic field to form an oriented second thermoplastic resin material; and
    cooling the seeded thermoplastic resin mixture to form crystal growth in the seeded thermoplastic resin mixture, said crystals aligned with the second thermoplastic resin material.

15. A thermoplastic resin material mixture, comprising:
a first thermoplastic resin material having a first melting point, said first thermoplastic resin material in a melted state;
a second thermoplastic resin material, said second thermoplastic resin material comprising an amount of a ferromagnetic material, and said second thermoplastic resin material having a second melting point, and said second thermoplastic resin material in a crystalline state;
wherein the second melting point exceeds the first melting point by a temperature difference ranging from about 10° F. to about 50° F.; and
wherein the thermoplastic resin material mixture is in a substantially uniformly oriented state.

16. The thermoplastic resin material mixture of claim 15:
wherein the first thermoplastic resin material comprises polyether ether ketone; and
wherein the second thermoplastic resin material comprises polyether ketone ketone and an amount of ferromagnetic material responsive to a magnetic force, said magnetic force having a magnetic flux density ranging from about 0.1T to about 1 T.

17. A composite material comprising the oriented thermoplastic resin made according to the method of claim 14.

18. The composite material of claim 17, wherein the oriented crystalline thermoplastic resin material comprises grain sizes ranging from about 10 μm to about 1 mm.

19. An object comprising the composite material of claim 17.

20. A vehicle comprising the object of claim 19, wherein said vehicle comprises at least one of: a manned aircraft, an unmanned aircraft, a manned spacecraft, an unmanned spacecraft, a manned rotorcraft, an unmanned rotorcraft, a manned terrestrial vehicle, an unmanned terrestrial vehicle, a manned surface water borne vehicle, an unmanned surface water borne vehicle, a manned sub-surface water borne vehicle, an unmanned sub-surface water borne vehicle, and a satellite.

* * * * *